Nov. 1, 1955     CHONG-HUNG ZEE     2,722,236

MIXING VALVE

Filed Feb. 10, 1955

INVENTOR.

BY Chong-Hung Zee

United States Patent Office 2,722,236
Patented Nov. 1, 1955

2,722,236

MIXING VALVE

Chong-Hung Zee, New York, N. Y.

Application February 10, 1955, Serial No. 487,321

1 Claim. (Cl. 137—637.4)

This invention relates to an improved mixing valve comprising a rotative hollow cylinder and a disk shifting along the axis of rotation as operative members, and is generally applicable to hot and cold water outlet systems in factories, laboratories, lavatories, kitchens etc., and is also applicable to piping systems in chemical or similar plants where two or more kinds of liquids are blended with desired proportions.

The primary object of this invention is to provide an improved mixing valve for mixing and delivering blended cold and hot water at any temperature within the range of the valve and at any magnitude of discharge within the capacity of the valve. As a special case of this object, the improved mixing valve may perform the function of a simple cold water valve or a simple hot water valve.

Another object of this invention is to provide an improved mixing valve to mix two or more kinds of liquids which are blended with desired proportion and to deliver the blended liquid at any desired rate within the capacity of the valve.

Further and additional objects and advantages not hereinbefore specified will become apparent hereinafter during the detailed description of an embodiment of the invention which is to follow and which embodiment is illustrated in the accompanying drawing wherein.

Figure 1:
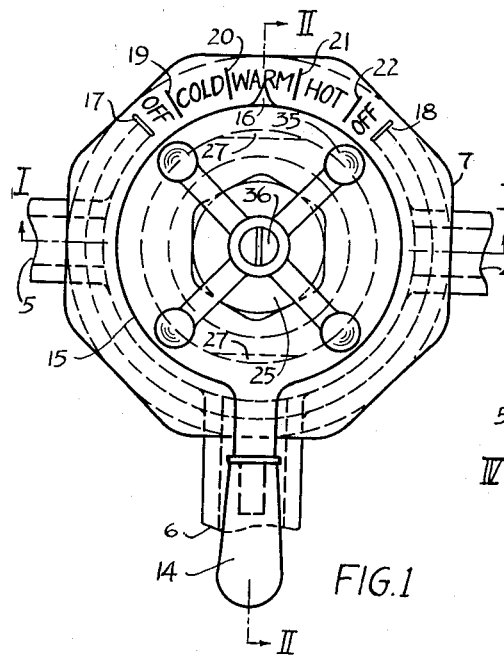
Fig. 1 is a top view of the improved mixing valve.
Figure 2:
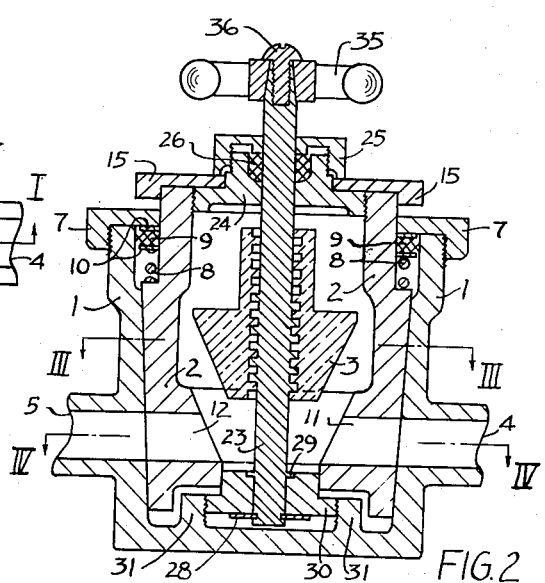
Fig. 2 is a cross-section on line I—I of Fig. 1 looking in the direction of the arrows.
Figure 4:
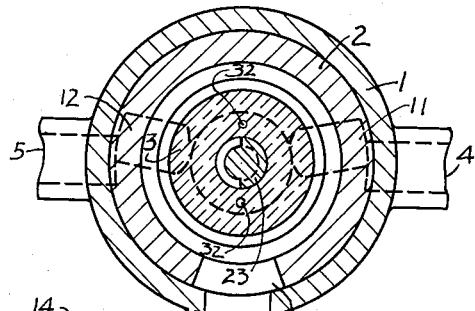
Fig. 4 is a cross-section on line III—III of Fig. 2 looking downward.
Figure 3:
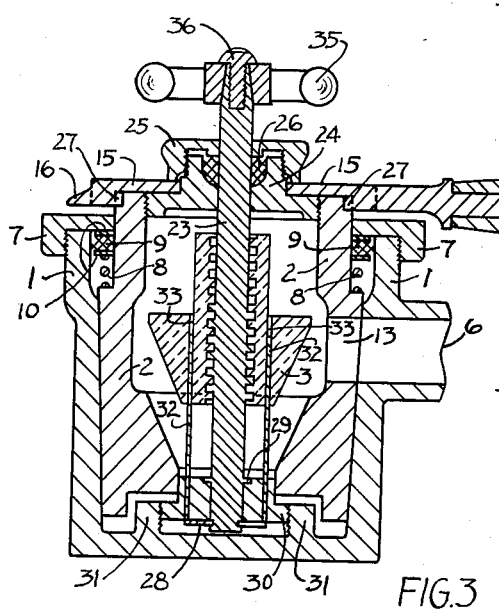
Fig. 3 is a cross-section on line II—II of Fig. 1 looking in the direction of the arrows.

As shown in the drawing, the valve comprises a cylindrical shell 1, a rotative hollow cylinder 2 and a right conical frustum disk 3 and these three elements are concentric one to another. Cylindrical shell 1 has hot water inlet 4, cold water inlet 5 and blended water outlet 6 and is threaded at its top end on which stuffing nut 7 is to be mounted. The contact surface between cylindrical shell 1 and rotative hollow cylinder 2 is conical and machine finished so that the tightness of the contact surface is assured. Further guarantee against leakage along the contact surface is accomplished by use of spring 8, packing 9 and two washers 10 through tightening stuffing nut 7 against the top end of cylindrical shell 1.

Figure 5:
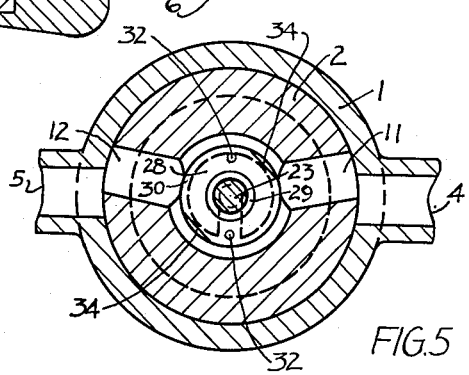
Fig. 5 is a cross-section on line IV—IV of Fig. 2 looking downward.

Hot water inlet 11, cold water inlet 12 and blended water outlet 13 are located in the wall of rotative hollow cylinder 2. By rotating rotative hollow cylinder 2, the intercepting areas between inlets 4 and 11 for hot water and inlets 5 and 12 for cold water vary; the relative locations of inlets 11 and 12 are so arranged that when inlet 4 coincides fully with inlet 11, that is, full hot water supply, the intercepting area between inlets 5 and 12 is just zero and vice versa. The size and location of outlet 13 are determined by the requirement that the intercepting area between outlets 13 and 6 has always the same proportion to the sum of the intercepting areas between inlets 4 and 11 and inlets 5 and 12. Fig. 5 illustrates rotative hollow cylinder 2 being in such an orientation that gives half hot water and half cold water supply with full outlet intercepting area. The rotation of rotative hollow cylinder 2 is operated by turning grip 14 which is attached to cap 15. Pointer 16 is located on the opposite side of grip 14 on cap 15, which points at signs "Off," "Cold," "Warm" and "Hot" on stuffing nut 7. The range of movement of pointer 16 is limited by the small projections 17 and 18 located beyond two "Off" signs. As pointer 16 points at the range between small projection 17 and division mark 19, where "Off" sign is shown, no water is delivered. As pointer 16 points at the range between division marks 19 and 20, where "Cold" sign is shown, only cold water is supplied and delivered, no hot water is supplied. As pointer 16 points at the range between division marks 20 and 21, where "Warm" sign is shown, both hot and cold water are supplied and warm water is delivered. As pointer 16 points at the range between division marks 21 and 22, where "Hot" sign is shown, only hot water is supplied and delivered, no cold water is supplied. As pointer 16 points at the range between division mark 22 and small projection 18, where "Off" sign is shown, no water is delivered. By keeping disk 3 at a certain position, that is, a certain opening, the discharge of cold water gradually increases as pointer 16 is shifted from division mark 19 to division mark 20 within "Cold" sign range. The proportion of hot water in the blended water increases as pointer 16 is shifted from division mark 20 to division mark 21 within the range of "Warm" sign. However, the discharge of blended water can only be controlled through the adjustment of the opening formed by disk 3 and the inside conical surface of rotative hollow cylinder 2, this adjustment is performed by shifting disk 3 along stem 23 following the rotation of the latter. When pointer 16 reaches division mark 21, only hot water is supplied, with disk 3 at a certain position, that is, a certain opening, the delivery of hot water decreases as pointer 16 is shifted toward the division mark 22. When pointer 16 points at division mark 22 and sign "Off," no water is delivered. Of course it is obvious that for a certain setting of pointer 16 on sign "Cold" or "Hot," the discharge of cold or hot water can be adjusted by shifting disk 3.

The top of rotative hollow cylinder 2 is sealed by bonnet 24 which holds bonnet stuffing nut 25 and bonnet packing 26. Segments 27 on the inside circumference of cap 15 and corresponding notches at two opposite sides of top end of rotative hollow cylinder 2 prevent any relative rotating between cap 15 and rotative hollow cylinder 2, and by tightening stuffing nut 25 against bonnet 24, cap 15 is firmly seated on top end of rotative hollow cylinder 2.

Disk 3 is mounted on stem 23 which is concentric with cylindrical shell 1 and rotative hollow cylinder 2. Through the rotation of stem 23 and the connection of square threads between, disk 3 is shifted along stem 23. With notched washer 28 at its lower end and collar 29 integral with it, stem 23 is held by seat ring 30, which is in turn rooted by threads to projected ring 31 on bottom of cylindrical shell 1. Rotation of disk 3 as a result of rotation of stem 23 is prevented by two pins 32 slid through holes 33 and fixed on seat ring 30. As disk 3 reaches its lowest position, that is, as the underside of disk 3 meets the top of seat ring 30, there is barely sufficient clearance between two conical surfaces of disk 3 and rotative hollow cylinder 2 so that the rotation of rotative hollow cylinder 2 is not effected. Segmental cuts 34 on seat ring 30 are entirely for the convenience of putting seat ring 30 into place. Top of stem 23 is squared on which a four-ball handle 35 is mounted and is locked by lock screw 36.

It is of course to be understood that the invention is not restricted to the specific form of embodiment illustrated and described. Various modifications and variations may be made in and from the constructional details shown. Thus, an improved mixing valve for mixing more than two kinds of liquids simply provides a number of inlets corresponding to the number of kinds of liquids to be mixed without altering the basic principle of the invention.

What I claim is:

A mixing valve comprising a cylindrical shell with one outlet and two inlets located 90° from each side of said outlet, a rotative hollow cylinder directly in contact with said shell through a conical surface and held firmly within said shell by a stuffing nut at the top of said shell with a spring and two washers and packing between the stuffing nut and cylinder, said hollow cylinder having two inlets and one outlet which correspond to those of said shell, said two inlets of said hollow cylinder being so located that when one inlet coincides fully with the inlet of said shell, the intercepting area of the other inlet with the corresponding inlet of said shell becomes zero, said outlet of said hollow cylinder having the size and location as required by the condition that the intercepting area between said outlet of said hollow cylinder and said outlet of said shell should always have the same proportion to the sum of the intercepting areas of two sets of said inlets, the top of said hollow cylinder being sealed by a bonnet and being covered by a cap having a grip and a pointer located on opposite sides, a bonnet stuffing nut with bonnet packing at top of said bonnet, said cap with segments on its inside circumference matching the corresponding cut on the top of said hollow cylinder, said cap being locked by tightening bonnet stuffing nut against said bonnet, said grip being operated to rotate said hollow cylinder and simultaneously to move said pointer from sign to sign, which are designated "Off," "Cold," "Warm" and "Hot" on said first-mentioned stuffing nut showing the rate of delivery and temperature of blended water, said operation of said grip being checked by two small projections located beyond two "Off" signs on said cap, a stem being concentric with said shell and said hollow cylinder having its top end squared and a four-ball handle mounted and locked to it by a lock screw, the bottom end of said stem being inserted into a seat ring which is rooted by threads to a projected ring on the bottom of said shell, said bottom end of said stem being notched and a notched washer together with a collar integral with said stem keeping said stem onto said seat ring, said seat ring having segmental cuts on its unthreaded portion for convenience of putting said seat ring into place, said stem having square threads on its middle portion, which matches the corresponding threads on a disk, said disk being concentric with said stem and being shifted along said stem as said stem is rotated, the rotation of said disk being prevented by two pins rooted to said seat ring and inserted into two corresponding holes in said disk, said disk having a conical surface which just matches but is not in contact with the inside conical surface of said hollow cylinder as said disk reaches its lowest position, thus the rotation of said hollow cylinder is not affected by the closing position of said disk.

References Cited in the file of this patent

UNITED STATES PATENTS

| | | |
|---|---|---|
| 1,517,990 | Hinkle | Dec. 2, 1924 |
| 2,158,342 | Trader | May 16, 1939 |